(12) United States Patent
Buhler et al.

(10) Patent No.: US 9,763,092 B2
(45) Date of Patent: *Sep. 12, 2017

(54) AUTHENTICATION OF USER COMPUTERS

(71) Applicant: International Business Machines Corporation, Armonk, NY (US)

(72) Inventors: Peter Buhler, Horgen (CH); Jan L. Camenisch, Thalwil (CH); Diego A. Ortiz-Yepes, Adliswil (CH); Franz-Stefan Preiss, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,929

(22) Filed: Nov. 8, 2016

(65) Prior Publication Data

US 2017/0055154 A1    Feb. 23, 2017

Related U.S. Application Data

(63) Continuation of application No. 14/692,441, filed on Apr. 21, 2015, now Pat. No. 9,578,505.

(51) Int. Cl.
H04L 29/06 (2006.01)
H04W 12/06 (2009.01)

(52) U.S. Cl.
CPC .......... *H04W 12/06* (2013.01); *H04L 63/083* (2013.01); *H04L 63/0876* (2013.01); *G06F 2221/2111* (2013.01); *G06F 2221/2151* (2013.01)

(58) Field of Classification Search
CPC ................................................... H04W 12/06
See application file for complete search history.

(56) References Cited

U.S. PATENT DOCUMENTS 7,219,833 B2    5/2007  Cantini et al.
8,493,213 B2    7/2013  Holley et al.
(Continued)

FOREIGN PATENT DOCUMENTS

WO    2013002891 A1    1/2013

OTHER PUBLICATIONS

Camenisch et al., "Efficient Group Signature Schemes for Large Groups", Advances in Cryptology—CRYPTO '97, vol. 1296 of Lecture Notes in Computer Science, pp. 410-424, Springer Verlag, 1997, <ftp://ftp.inf.ethz.ch/pub/crypto/publications/CamSta97.pdf>.

(Continued)

*Primary Examiner* — Shawnchoy Rahman
(74) *Attorney, Agent, or Firm* — Maeve Carpenter

(57) ABSTRACT

An approach for authenticating a user computer, connectable to a mobile network includes a computing device retrieving an attribute credential, the attribute credential certifying a set of user attributes, a device identifier for identifying the user computer to the mobile network, a location credential, the location credential certifying a device identifier and location data indicating a location of the user computer determined by the mobile network. The approach includes a computer producing an authentication token comprising the attribute credential, the location credential, the location data and a proof for proving that the device identifier in the attribute credential equals the device identifier in the location credential. The approach includes a computer producing a blinded attribute credential by randomized blinding of the attribute credential, wherein the authentication token includes the blinded attribute credential and the proof verifies possession by the user computer of the attribute credential in the blinded attribute credential.

20 Claims, 4 Drawing Sheets

(56) References Cited

U.S. PATENT DOCUMENTS

| | | | |
|---|---|---|---|
| 8,578,457 | B2 | 11/2013 | Kan |
| 8,660,015 | B2 | 2/2014 | Issakov et al. |
| 8,725,652 | B2 | 5/2014 | Faith |
| 8,800,007 | B1 | 8/2014 | Rajagopalan |
| 8,990,568 | B2 | 3/2015 | Kelley |
| 2007/0177763 | A1 | 8/2007 | Joo |
| 2013/0005352 | A1 | 1/2013 | Jones |
| 2013/0198516 | A1* | 8/2013 | Fenton ............... H04L 63/0869 713/168 |
| 2013/0273882 | A1 | 10/2013 | Walsh et al. |
| 2013/0290119 | A1 | 10/2013 | Howe et al. |
| 2014/0164254 | A1 | 6/2014 | Dimmick |
| 2015/0339768 | A1* | 11/2015 | Wolberg-Stok ....... H04W 12/06 705/51 |

OTHER PUBLICATIONS

Camenisch et al., "A Signature Scheme with Efficient Protocols", Security in Communications Networks, Third International Conference, SCN 2002, vol. 2576 of Lecture Notes in Computer Science, 21 pages, Springer Verlag, 2003, <http://groups.csail.mit.edu/cis/pubs/lysyanskaya/cl02b.pdf>.

Damgard et al., "A Statistically-Hiding Integer Commitment Scheme Based on Groups with Hidden Order", ASIACRYPT 2002, LNCS 2501, pp. 125-142, 2002, <http://download-v2.springer.com/static/pdf/731/chp%253A10.1007%252F3-540-36178-2_8.pdf?token2=exp=1428356250~acl=%2Fstatic%2Fpdf%2F731%2Fchp%25253A10.1007%25252F3-540-36178-2_8.pdf*~hmac=52df7caa1e1f3dd9013ba80fdba63503db9c48723a81ce407fbf615e78c69e83>.

Fiat et al., "How to Prove Yourself: Practical Solutions to Identification and Signature Problems", Advances in Cryptology—CRYPTO '86, vol. 263 of Lecture Notes in Computer Science, pp. 186-194, Springer Verlag, 1987, <http://download-v2.springer.com/static/pdf/872/chp%253A10.1007%252F3-540-47721-7_12.pdf?token2=exp=1428357454~acl=%2Fstatic%2Fpdf%2F872%2Fchp%25253A10.1007%25252F3-540-47721-7_12.pdf*~hmac=325575078e63304c202bd8507f279b1adf09f6fe7cd799c6fb2c96b83ceaf3db>.

Marforio et al., "Smartphones as Practical and Secure Location Verification Tokens for Payments", NDSS '14, Feb. 23-26, 2014, Copyright 2014 Internet Society, ISBN 1-891562-35-5, 15 pages, <http://dx.doi.org/10.14722/ndss.2014.23165>.

Park et al., "Leveraging Cellular Infrastructure to Improve Fraud Prevention", Annual Computer Security Applications Conference, 2009 (ACSAC '09), Dec. 7-11, 2009, pp. 350-359, <http://ieeexplore.ieee.org/stamp/stamp.jsp?tp=&arnumber=5380689>.

Pedersen et al., "Non-interactive and Information-Theoretic Secure Verifiable Secret Sharing", Advances in Cryptology—CRYPTO '91, vol. 576 of Lecture Notes in Computer Science, pp. 129-140, Springer Verlag, 1992, <http://www.cs.huji.ac.il/~ns/Papers/pederson91.pdf>.

Verheul, "Self-Blindable Credential Certificates from the Weil Pairing", Advances in Cryptology ASIACRYPT 2001, Lecture Notes in Computer Science, vol. 2248, 2001, pp. 533-551, <http://download-v2.springer.com/static/pdf/431/chp%253A10.1007%252F3-540-45682-1_31.pdf?token2=exp=1428357844~acl=%2Fstatic%2Fpdf%2F431%2Fchp%25253A10.1007%25252F3-540-45682-1_31.pdf*~hmac=53657e31fecbdc46873223ab07ede94edfc3a1612d9242c05fa5167ed1df7ee5>.

"U-Prove", Microsoft Research, © 2015 Microsoft, 4 pages, downloaded on Apr. 6, 2015, <http://research.microsoft.com/en-us/projects/u-prove/>.

U.S. Appl. No. 14/692,441, filed Apr. 21, 2015.

List of IBM Patents or Patent Applications Treated as Related (Appendix P), Filed Nov. 8, 2016.

* cited by examiner

AUTHENTICATION OF USER COMPUTERS

BACKGROUND OF THE INVENTION

The present invention relates generally to authentication of user computers, and more specifically to authentication of a user computer, which is connectable to a mobile network, to a verifier server in the vicinity of the user computer.

There are many scenarios when a user computer may be used to authenticate to a verifier server in the same vicinity. For example, a user computer such as a mobile phone, tablet, personal digital assistant (PDA), etc., may store information which can be used to gain access to a product, a service or other resource on presentation of the information to the verifier server. A verifier server is a trusted source such as a bank, a credit service, a company server or other similar trusted computing resource or device which can verify or authenticate data related to a user, the user computer, and a transaction occurring. The user computer or mobile phone may contain, for example, information such as credit card details or mobile payment data used for purchasing goods or services at a point-of-sale device. In another example, the user computer may include user identification providing access to a building or other facility based on the user identification or user authorization data stored in the user computer.

However, in some cases, the user computer or smart phone might be infected by malware. Malware can capture the stored information and use it to authenticate a different user computer in some situations. Authentication information stored on a mobile phone, for instance, could be sent by malware to a malicious party and then used to obtain goods or services elsewhere in the user's name.

SUMMARY

Embodiments of the present invention disclose a method, a computer program product, and a system for authenticating a user computer, connectable to a mobile network. The method includes a computing device retrieving an attribute credential, the attribute credential certifying a set of user attributes, a device identifier for identifying the user computer to the mobile network, a location credential, the location credential certifying a device identifier and location data indicating a current location of the user computer determined by the mobile network. The method includes a computer producing an authentication token comprising the attribute credential, the location credential, the location data and a proof for proving that the device identifier in the attribute credential equals the device identifier in the location credential. Furthermore, the method includes a computer producing a blinded attribute credential by randomized blinding of the attribute credential, wherein the authentication token includes the blinded attribute credential and wherein the proof verifies possession by the user computer of the attribute credential in the blinded attribute credential.

The above embodiment offers an elegantly simple authentication method with a high level of user privacy. It can be confirmed that the user computer is at the correct location, i.e. in the vicinity of a verifier server, but the device identifier need not be revealed by the user computer because the proof demonstrates that the location credential certifies the same identifier as the attribute credential.

Another embodiment of the invention a computer program product for authenticating a user computer, connectable to a mobile network. The program instructions include instructions to retrieve an attribute credential, the attribute credential certifying a set of user attributes and a device identifier for identifying the user computer to the mobile network. Followed by program instructions to request a location credential, the location credential certifying a device identifier and location data indicating a current location of the user computer determined by the mobile network. Furthermore, the program instructions include instructions to produce an authentication token comprising the attribute credential, the location credential, the location data and a proof for proving that the device identifier in the attribute credential equals the device identifier in the location credential. In addition, the program instructions include instructions to send the authentication token to a verifier server for authentication of the user computer.

In an embodiment, the location credential may further certify a timestamp indicating an issue time for the location credential. This timestamp can be included in the authentication token. A verifier server can verify that the location credential certifies the timestamp, and determine if the issue time indicated by the timestamp is within a predetermined time interval preceding a current time. The authentication token can then only be used within a predetermined time interval following issue.

The attribute and location credentials may be included in the authentication token in encoded form. Some embodiments include, at the user computer, producing a blinded attribute credential by randomized blinding of the attribute credential. The blinded attribute credential can be included in the authentication token, and the proof can be adapted for proving possession by the user computer of the attribute credential in the blinded attribute credential. The user computer may similarly produce a blinded location credential for inclusion in the authentication token, with the proof being adapted for proving possession by the user computer of the location credential in the blinded location credential. This use of randomized blinding of the credentials may offer enhanced privacy by preventing different transactions with the same user computer being linked via use of the credentials.

In various embodiments, a verifier server sends policy data to the user computer. The policy data defines a condition for authentication of the user computer. The policy data is received by the user computer that produces the proof in the authentication token such that the proof is adapted for proving that this authentication condition is satisfied by the set of user attributes in the attribute credential. The verifier server can then verify from the proof that the authentication condition is satisfied by the set of user attributes. This may further enhance privacy because the user computer need only reveal information about the attribute set which is specifically required for authentication.

In an embodiment, a verifier server may send to the user computer a context message defining context information for the authentication. The proof generated by the user computer can be dependent on the context message. The verifier server can then verify that the proof is dependent on the context message. This provides added security in that the authentication token can only be used for the particular authentication process identified by the context information.

Embodiments of the invention will be described in more detail below, by way of illustrative and non-limiting example, with reference to the accompanying drawings.

DETAILED DESCRIPTION

Embodiments of the present invention recognize that some service providers such as some payment systems obtain the location of a user's mobile device from a mobile network operator and compare this location with the merchant location as part of the payment authorization process. A security issue is identified if the two locations do not correspond which may lead to a denial of service to the user by the service provider. Known systems and methods for a user device authorization, however, tend to compromise user privacy and/or require complex procedures for operation.

Embodiments of the present invention provide a method for an authentication process or procedure to authenticate a user's mobile computing device or smart phone by a verifier server to a service provider while keeping aspects of the user's data and the user computer data secure or separate from data shared with the verifier server. The authentication procedure may be performed in numerous scenarios using cryptographic techniques such as public-private key pairs. The authentication procedure may be performed as part of a transaction, such as a payment at a shop or cafe, or to gain access to a building or other facility, e.g., using a membership card to enter a club, or to obtain some item or other resource to which access is restricted by the service provider. The authentication procedure requires the user computer to be present in the vicinity of the verifier server. Embodiments of the present invention use a mobile network provided real-time mobile device location for the authentication requesting mobile device and a proof using cryptographic methods to verify that the mobile device identification for the device requesting authentication is the same mobile device identification as the device identification provided in the real-time mobile device location data. Furthermore, embodiments of the present invention verify that the mobile device requesting authentication is in the vicinity of the verifier server providing the authentication. Implementation of embodiments of the invention may take a variety of forms, and exemplary implementation details are discussed subsequently with reference to the Figures.

Figure 1:
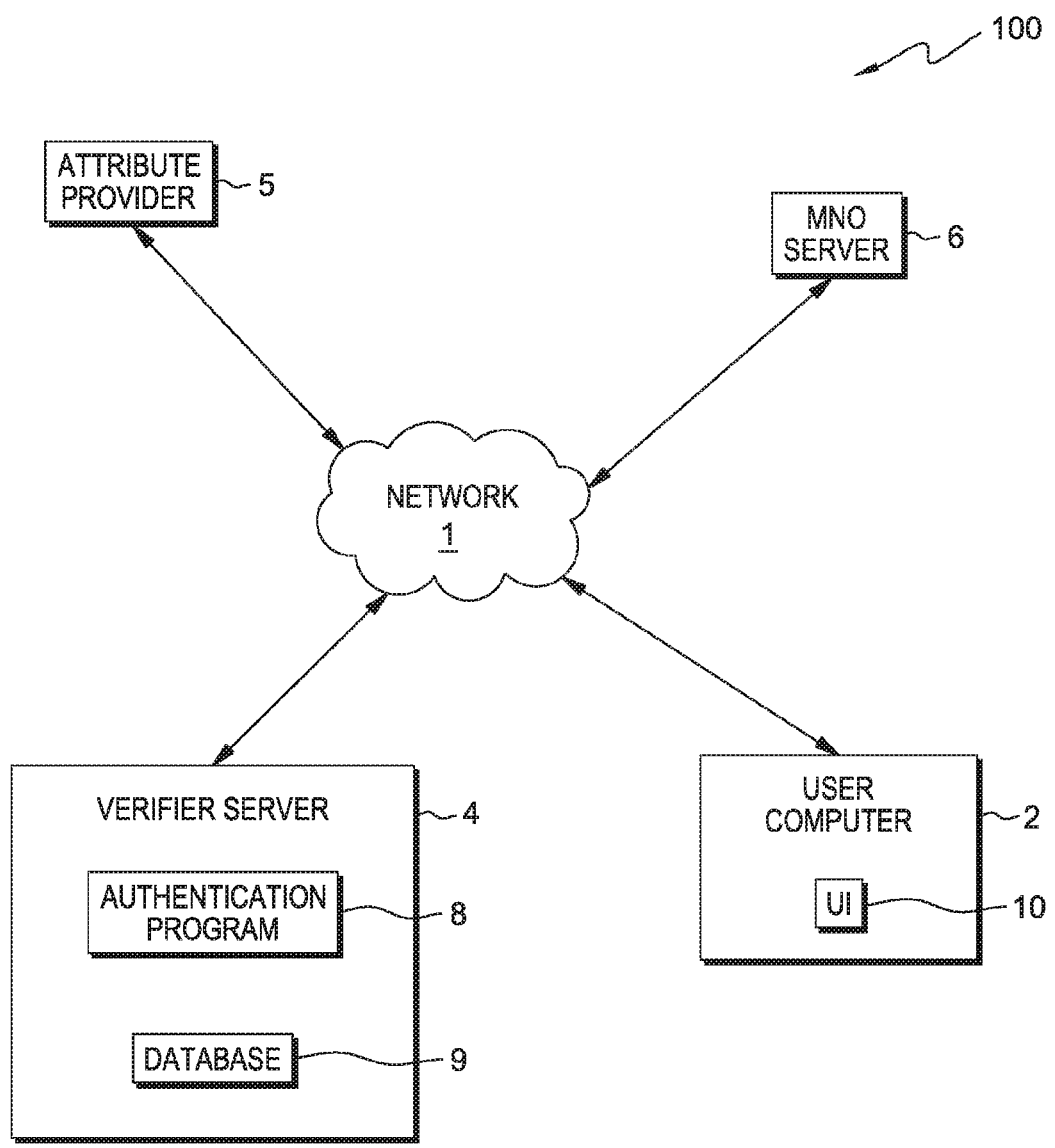
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user computer 2, verifier server 4, attribute provider 5, and mobile network operator (MNO) server 6, all interconnected over network 1. User computer 2 may be a mobile computing device and is connectable to a mobile network such as a cellular telecommunications network. Verifier server 4 is operated by an entity referred to herein as the "service provider". The service provider may be a store, a health spa, a building, a club, or other entity providing a good, a service, an access or other resource controlled or operated by the service provider that may be used or acquired by a device user on user computer 2. User computer 2 can be used by the device user in the vicinity of verifier server 4 to authenticate to the verifier server, thereby to obtain or access some resource controlled by the service provider. The location of the verifier server 4 may be predetermined for verifier server 4 or could itself be determined dynamically via a mobile network, e.g. for a verifier server comprising a hand-held payment terminal which may be used at multiple locations.

Network 1 can be, for example, a telecommunications network such as a mobile network, a local area network (LAN), a virtual local area network (VLAN), a wide area network (WAN), such as the Internet, or a combination of these, and can include wired, wireless, virtual, or fiber optic connections. Network 1 can include one or more wired and/or wireless networks that are capable of receiving and transmitting data, voice, and/or video signals, including multimedia signals that include voice, data, and video information. In general, network 1 can be any combination of connections and protocols that will support communications between user computer 2, verifier server 4, attribute provider 5, and MNO server 6 and other computing devices (not shown) within distributed data processing environment 100. In the exemplary embodiment, network 1 includes a cellular telecommunications network. In other embodiments, network 1 includes a Wi-Fi-based mobile network or any other network in which the locations of mobile computer devices can be identified for communication with user computer 2 via the components of network 1. Communication between the user computer 2 and verifier server 4 for the authentication process may in general be conducted over a communications channel provided via a temporary physical connection or a wireless link. Network 1 may include a communication channel such as a local communications protocol for near field communication (NFC), Wi-Fi or other wireless LAN (local area network) protocol, or may in general be provided via any convenient communications mechanism or network.

User computer 2 is a mobile computing device. User computer 2 may be, for example, a mobile phone, a smart phone, a tablet, a palmtop, a laptop, a notebook, a PDA (personal digital assistant), a wearable computing device such as a smart watch, a personal music player, a specialized computer device, or any mobile programmable electronic device capable of communicating with various components and devices within distributed data processing environment 100, and which is connectable to a mobile network, for example, network 1. User computer 2 is capable of sending and receiving data from verifier server 4, attribute provider 5, and MNO server 6. In some embodiments, user computer 2 includes a mobile device payment application such as a smart wallet. User computer 2 includes attribute credentials Catt received from attribute provider 5 stored in memory, such as memory 406 depicted and described with reference to FIG. 4, in persistent storage such as persistent storage 408 depicted in FIG. 4 or in another secure storage module of user computer 2. The attribute credential Catt which certifies at least the device identifier sid and a set of user attributes att. Attribute credentials can be obtained by user computer 2 in a variety of ways, e.g., by retrieving attribute credentials previously stored by the user in user computer 2, or via communication between user computer 2 and attribute provider 5 via network 1 such as a mobile network, a private network or the Internet. In various embodiments, device identification sid is stored in memory, persistent storage, or another secure location or module in user computer 2.

User computer 2 includes user inter face (UI) 10 that provides a user interface between a device user and user computer 2 enabling instructions and/or data communication with verifier server 4, authentication provider 5, and MNO server 6. UI 10 may be a graphical user interface (GUI) or a web user interface (WUI) and can access application interfaces, display text, documents, web browser windows, user options, and instructions for operation, and includes the information (such as graphic, text, and sound) that a program presents to a user and the control sequences the device user employs to interact with the other computing devices in distributed data processing environment 100 via network 1. In various embodiments, UI 10 is mobile application software that provides an interface between a user and the computing devices in distributed data processing environment 100. Mobile application software, or an "app," is a computer program designed to run on smart phones, tablet computers and other mobile devices. In an embodiment, UI 10 enables a device user of user computer 2 to communicate data or information for payment or authentication processes such as a password entry to user computer 2. In general, user computer 2 represents any mobile programmable electronic device or combination of programmable electronic devices capable of executing machine readable program instructions and communicating with other computing devices (not shown) within distributed data processing environment 100 via a network, such as network 1.

Verifier server 4 can be a standalone computing device, a management server, a web server, a mobile computing device, or any other electronic device or computing system capable of receiving, sending, and processing data. Verifier server 4 is capable of communicating with user computer 2, attribute provider 5, MNO server 6, and other computing devices (not shown) within distributed data processing environment 100 via network 1, which may be a mobile network. Verifier server 4 may comprise, for example, a point-of-sale device such as a cash register or other payment terminal, an ATM (automated teller machine), a parking meter, a vending machine, a ticket machine, an access-point device e.g., for controlling entry to a building or other facility, or any other device at which a user may present user computer 2 for authentication purposes. In various embodiments, verifier server 4 is a single "user-facing" device at which a user can present user computer 2 for authentication purposes. Verifier server 4 may be implemented by such a device alone or in combination with one or more further devices, e.g., another computer with which the user-facing device can communicate to implement some aspect of the verifier server functionality. In other embodiments, verifier server 4 can represent a server computing system utilizing multiple computers as a server system, such as in a cloud computing environment. In another embodiment, verifier server 4 can be a laptop computer, a tablet computer, a netbook computer, a personal computer (PC), a desktop computer, a personal digital assistant (PDA), a smart phone, or any programmable electronic device capable of communicating with user computer 2, attribute provider 5, MNO server 6, and other computing devices (not shown) within distributed data processing environment 100 via network 1. The operation and storage of each server and/or device may be performed on one or more devices as long as the server and/or devices access network 1. In another embodiment, verifier server 4 represents a computing system utilizing clustered computers and components (e.g., database server computers, application server computers, etc.) that act as a single pool of seamless resources when accessed within distributed data processing environment 100. Verifier server 4 includes authentication program 8 and database 9.

Attribute provider 5 provides cryptographic credentials. Attribute provider 5 is a credential issuer. The attribute provider is trusted by service providers to attest attributes certified by a credential. The attribute credential $C_{att}$ certifies a set of user attributes and a device identifier for identifying the user computer 2 to the mobile network. The attribute credential certifies at least the set of user attributes att and the device identifier sid for identifying user computer 2 to the mobile network. Attribute provider 5 may certify a set of user attributes att by producing an attribute credential $C_{att}$. The attribute credential $C_{att}$ may comprise more than one user attribute. A given user attribute may comprise data representing any item of information which may be required for the authentication process. Typical examples include: payment data such payment account details (e.g. credit card, debit card or account card details) and payment tokens such as bitcoins or other e-cash; device data defining attributes of the user computer 2; and personal user information such as date of birth, nationality, job title, and so on. Cryptographic protocols are known which permit credentials to be issued without revealing attributes certified by the credential to the credential issuer. The credential may certify attributes using a cryptographic key of attribute provider 5. A service provider can then verify that the credential was produced using the correct key. For example, e attribute provider 5 may produce the credential using a private key of a public-private key pair, the public key of which can be used for the verification.

Attribute provider 5 sends the attribute credential to user computer 2, which stores the attribute credential in user computer 2 memory or pervasive storage, for example, for retrieval and use in the authentication procedure. The particular nature of attribute provider 5, and the way in which attributes are confirmed by the attribute provider, are well known and need not be discussed herein.

MNO server 6 is a computing device used as a part of a mobile network by a mobile network operator such as a cellular telecommunications network or provider. MNO server 6 can be a standalone computing device, a management server, a web server, a mobile computing device, or any other electronic device or computing system capable of receiving, sending, and processing data. MNO server 6 is capable of communicating with user computer 2, verifier server 4, attribute provider 5, and other computing devices (not shown) within distributed data processing environment 100 via a cellular telecommunications network that may be a part of network 1. MNO server 6 may be implemented by such a device alone or in combination with one or more further devices, e.g. another computer with which the user-facing device can communicate to implement some aspect of the verifier server functionality. In other embodiments, MNO server 6 can represent a server computing system utilizing multiple computers as a server system, such as in a cloud computing environment. In another embodiment, MNO server 6 can be a laptop computer, a tablet computer, a netbook computer, a personal computer (PC), a desktop computer, a personal digital assistant (PDA), a smart phone, or any programmable electronic device capable of communicating with user computer 2, attribute provider 5, verifier server 4, and other computing devices (not shown) within distributed data processing environment 100. In another embodiment, MNO server 6 represents a computing system utilizing clustered computers and components (e.g., database server computers, application server computers, etc.) that act as a single pool of seamless resources when accessing network 1 within distributed data processing environment 100. In various embodiments, each of the programs and databases located on each of user computer 2, verifier server 4, attribute provider 5 and MNO server 6 can reside on various other computing devices within distributed data processing environment 100, provided each has access to information and storage for implementation and operation of the present invention via network 1.

Authentication program 8 resides on verifier server 4. Authentication program 8 provides the functionality for implementing steps of the authentication process as discussed later in FIG. 3. The authentication program 8 may be implemented in hardware, software, or a combination thereof. Authentication program 8 may, for example, comprise a computer-readable storage medium having embodied therewith program instructions, the program instructions being executable by the verifier server to cause the server to perform steps of the authentication process. Authentication program 8 performs a cryptographic verification process in accordance with the cryptographic protocols underlying the credential system. In this process, the authentication program 8 verifies from the proof H presented with authentication token T from user computer 2 that the device identifier sid in the attribute credential $C_{att}$ equals the device identifier sid in the location credential $C_{loc}$ provided to the user computer by the mobile network. Authentication program 8 also verifies that the location credential $C_{loc}$ certifies the location data loc in the authentication token. This part of the verification process may check that the location data loc is validly certified by the location credential $C_{loc}$ based on a cryptographic key used to generate the location credential, e.g. using a public key of a public/private key pair the private key of which was used to produce the credential. The authentication program 8 further determines if the current location of user computer 2 indicated by the location data $C_{loc}$ is in the vicinity of the verifier server 4. The current user computer 2 location identified by location data $C_{loc}$ can be compared here with a known location of the verifier server 4.

Database 9 resides on verifier server 4. Database 9 stores data used by user computer 2 and authentication program 8 in the authentication process. Database 9 may send and receive data such as device identifier sid from user computer 2, attribute provider 5, MNO server 6, and authentication program 8. Database 9 may reside in memory in MNO server 6 (e.g., memory 406 in FIG. 4) or persistent storage (e.g., persistent storage 408 in FIG. 4). In an embodiment, database 9 resides in another computing device, server, and a connected group of computing resources such as on a cloud. In various embodiments of the present invention, the information and data stored in database 9 may be stored in a single database, or on one or more databases located elsewhere in distributed data processing environment 100, accessible via network 1. In embodiments as discussed below, the data stored in database 9 may include cryptographic keys, e.g., public keys of public-private key pairs, policy data, device identifier sid, attribute credential $C_{att}$, an authentication token T from user computer 2, and a location credential $C_{loc}$ provided by MNO server 6 and/or user computer 2. Policy data received from user computer 2 defines a condition for authentication of the user computer. The policy data defines one or more conditions that must be satisfied by attributes in credentials presented by user computers 2 for the authentication process to succeed or proceed. Database 9 provides public keys of public-private key pairs to authentication program 8 on verifier server 4.

Figure 2:
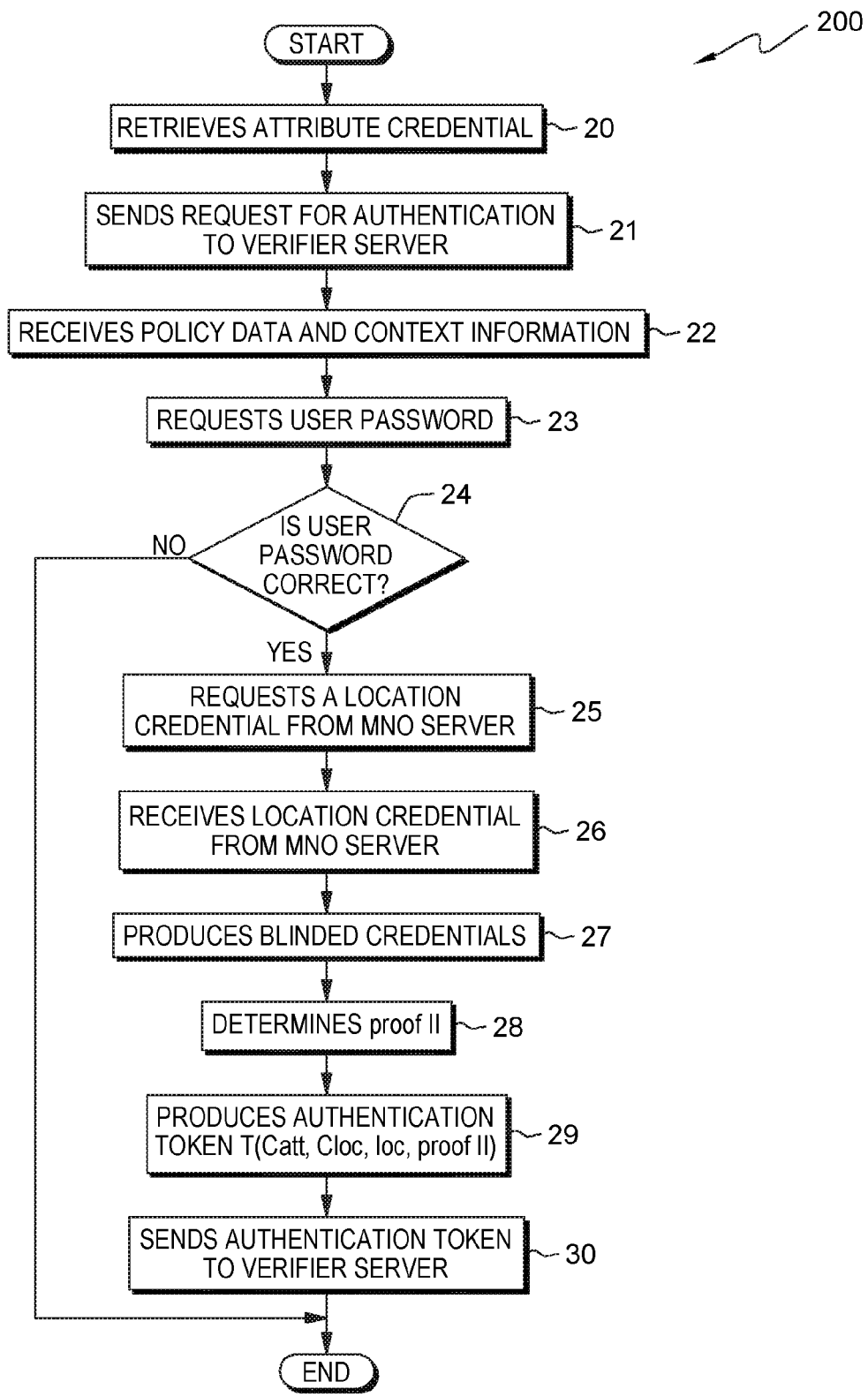
FIG. 2 is a flowchart depicting operational steps of an authentication procedure as performed by a user computer requesting authentication from a verifier server in the vicinity of the user computer within the distributed data processing environment of FIG. 1, to authenticate the user computer, in accordance with an embodiment of the present invention.

FIG. 2 is a flowchart 200 depicting operational steps of an authentication procedure as performed by user computer 2 requesting authentication from verifier server 4 in the vicinity of user computer 2 within the distributed data processing environment 100 of FIG. 1, to authenticate user computer 2, in accordance with an embodiment of the present invention.

In step 20, user computer 2 retrieves attribute credentials. The attribute credential $C_{att}$ certifies a set of user attributes and a device identifier for identifying the user computer to the mobile network. The attribute credential stored by user computer 2 in user computer 2 memory or pervasive storage, for example, is retrieved for use in the authentication procedure. The authentication procedure initiates with attribute credential retrieval and as user computer 2 in the vicinity of verifier server 4 which is presented by the device user to verifier server 4 for authentication. In some embodiments, initiation of the authentication procedure may require entry of a user password p into user computer 2 by the device user via UI 10. In step 21, user computer 2 sends a request for authentication to verifier server 4. In response, user computer 2 receives policy data and context information in step 22 from verifier server 4. The policy data defines at least one condition for authentication. The authentication condition may comprise one or more component conditions. Such a component condition may indicate, for example, that a particular user attribute or a set of user attributes must be demonstrated, or that a given attribute must satisfy a particular requirement such as being a member of an allowed set of attributes or falling within a defined range.

In step 23, user computer 2 requests a user password. In UI 10, user computer 2 displays to the device user a prompt requesting the user password. The device user may unlock the user computer 2 for the authentication process by entering a user password p. The password may comprise a PIN (personal identity number) or other alphanumeric string, biometric data such as a fingerprint scan or voice sample, or other available personal identifier. The device user inputs via UI 10, the password such as password p to user computer 2. In decision step 24, user computer 2 determines if the user password is correct. On receipt of the input password in step decision 24, user computer 2 performs a password verification process to verify that the input password is the correct user password p. The password verification may involve checking the input password against a password p previously stored in user computer 2, for example in user computer 2 memory or persistent storage. If in step decision 24, user computer 2 determines that the password input by the device user on UI 10 does not match the password stored in user computer 2 (no branch, decision step 24), then the password is not correct, and the authentication procedure ends. However, if user computer 2 determines that the password entered by the device user via UI 10 matches the password stored in user computer 2 (yes branch, decision step 24), then, the password is correct and the authentication procedure proceeds to step 25.

In step 25, user computer 2 requests a location credential from MNO server 6. User computer 2 communicates with the mobile network, for example, network 1, to request a location credential from MNO server 6. MNO server 6 determines the current location of user computer 2 via the mobile network infrastructure based on the device identifier sid which identifies user computer 2 in the mobile network. MNO server 6 generates a location credential $C_{loc}$ which certifies the device identifier sid and location data loc which indicates the detected location of user computer 2. In operation of the authentication procedure, the user computer 2 can dynamically obtain a cryptographic credential, namely a location credential $C_{loc}$. The location credential $C_{loc}$ is obtained via communication with mobile network as indicated schematically in FIG. 1. The location credential certifies at least the device identifier sid and location data loc which indicates the current location of user computer 2 determined by the mobile network using, for example, MNO server 6. The location data loc may indicate location in any convenient manner, e.g. in terms of geographical coordinates, map region, zip code, address, etc. In an embodiment described below, the location credential is obtained directly from the mobile network operator such as provided by MNO server 6. For example, location credential $C_{loc}$ may be obtained by direct communication between user computer 2 and a MNO server 6 via the mobile network. Location credential $C_{loc}$ may certify the device identifier sid and location data, loc under a cryptographic key. In an embodiment described below, this cryptographic key is a private key of a public-private key pair of the mobile network operator. Location credential $C_{loc}$ can be generated using a known credential issuance protocol, and may be produced using a cryptographic key of the MNO server 6. The user computer 2 receives the location credential $C_{loc}$ (loc, sid) from MNO server 6 in step 26.

In step 27, the user computer 2 produces blinded attribute credentials. The blinded attribute credentials include a blinded location credential. The blinded attribute credential and the blinded attribute location credentials are produced by known methods of randomized blinding of the attribute credential and location credential respectively. The details of the use of the blinded attribute credentials are discussed in more detail later in FIG. 3.

In step 28, user computer 2 determines proof Π. User computer 2 computes proof Π in a known manner, in accordance with the cryptographic protocols underlying the credential system, for proving that the device identifier sid in the attribute credential $C_{att}$ equals the device identifier sid in the location credential $C_{loc}$. In this example, the proof Π is also adapted for proving that the authentication condition defined by the policy data received in step 22 is satisfied by the set of user attributes att in the attribute credential $C_{att}$, e.g. that the credential contains the required attribute(s) and/or that one or more attributes meets a specified requirement. The proof Π may also prove other facts to be demonstrated to the verifier as discussed further below in FIG. 3.

In step 29, user computer 2 produces authentication token T ($C_{att}$, $C_{loc}$, loc, and proof Π). Authentication token T includes attribute credential $C_{att}$, location credential $C_{loc}$, and proof Π. The attribute credential $C_{att}$ may comprise one or more user attributes such as device identification sid and user payment account details. The location credential $C_{loc}$ includes device identification sid and the current device location provided by MNO server 6. Proof Π verifies that the device identification in both provided credentials is the same. The credentials $C_{att}$ and $C_{loc}$ may be incorporated in the authentication token in encoded form as explained below. The location data loc can be supplied to the user computer together with the location credential $C_{loc}$ from the MNO server 6. Other embodiments might be envisaged in which the user computer may obtain the location data loc from the location credential based on the cryptographic key used to produce the credential, e.g. using a public key of a public/private key pair the private key of which was used to produce the credential.

In step 30, user computer 2 sends the authentication token T to verifier server 4 for authentication of the user computer. The authentication token T sent to verifier server 4 is used by authentication program 8 to perform a cryptographic verification process in accordance with the cryptographic protocols underlying the credential system. In this process, the authentication program 8 verifies from the proof Π that the device identifier sid in the attribute credential $C_{att}$ equals the device identifier sid in the location credential $C_{loc}$. The authentication program logic 8 verifies that the location credential $C_{loc}$ certifies the location data loc in the authentication token T and may check that the location data loc is validly certified by the location credential $C_{loc}$ using a public key of a public/private key pair the private key of which was used to produce the credential.

Upon receiving the authentication token T from user computer 2, authentication program 8 on MNO server 6 further determines if the current location of user computer 2 indicated by the location data loc is in the vicinity of the verifier server 4. The current user computer location can be compared here with a known location of verifier server 4. Authentication program 8 may check that user computer 2 is within a threshold distance of verifier server 6. Authentication program 8 further determines if the set of user attributes att certified by the attribute credential $C_{att}$ satisfies the condition for authentication of the user computer. In this embodiment, the authentication logic checks that the proof Π proves that the authentication condition defined by the policy data sent in step 21 is satisfied by the set of user attributes att in the attribute credential $C_{att}$. This part of the verification process may require that the attribute credential $C_{att}$ is a valid certification of the required attribute(s) based on a cryptographic key used to generate the attribute credential, e.g. using a public key of a public/private key pair the private key of which was used by attribute provider 5 to produce the credential. In an embodiment, upon sending the authentication token T to verifier server 6 for authentication by authentication program 8 on the server, user computer 2 finishes the steps for presentation and authentication procedure with verifier server 4, and user computer 2 ends processing.

Figure 3:
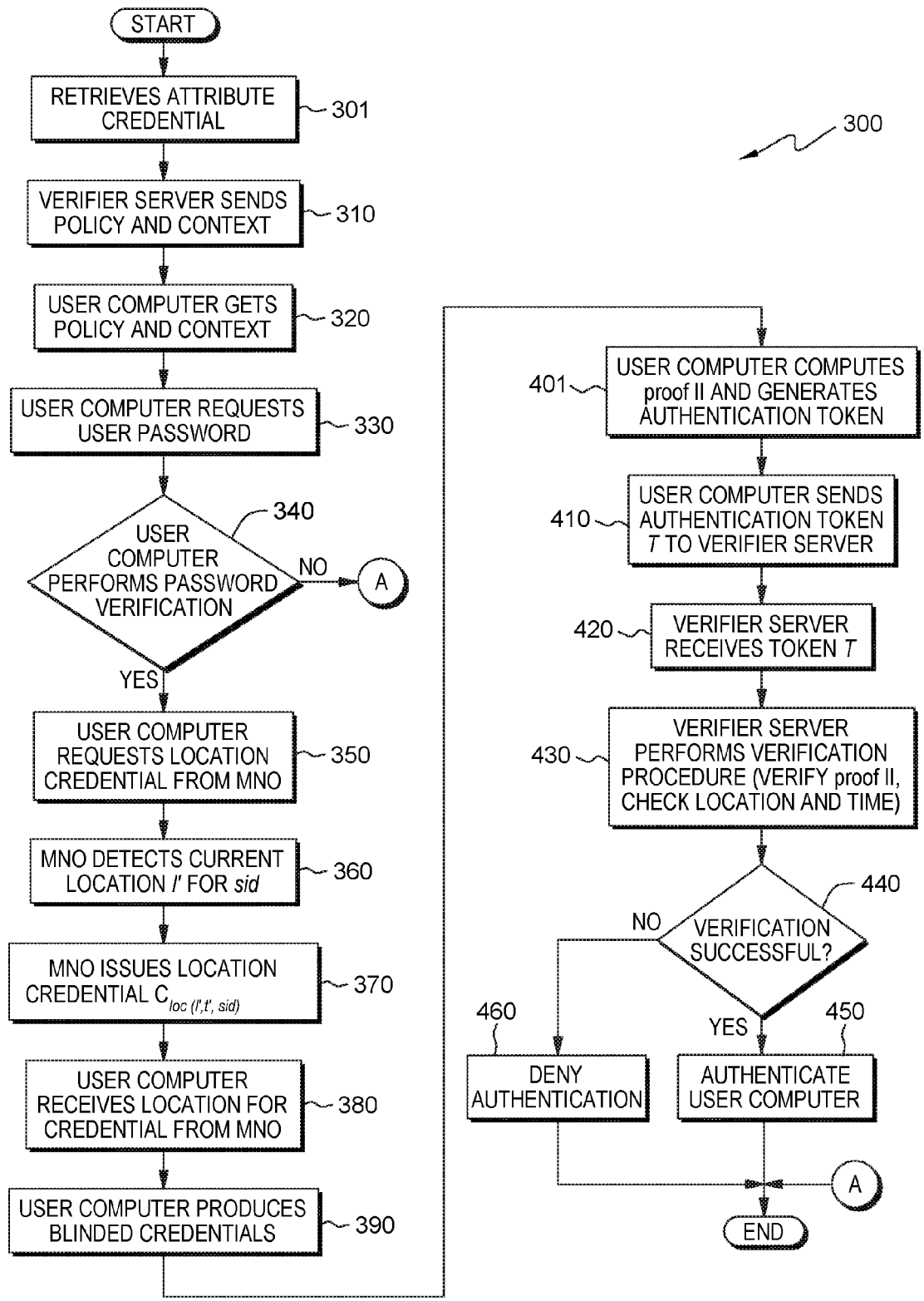
FIG. 3 is a flow diagram depicting operational steps of an embodiment of an authentication procedure within the distributed data processing environment of FIG. 1, for authenticating a user computer by a verifier server, in accordance with an embodiment of the present invention.

FIG. 3 is a flow diagram 300 depicting operational steps of an authentication procedure within distributed data processing environment 100, for authenticating a user computer 2 by a verifier server 4, in accordance with an embodiment of the present invention. FIG. 3 depicts a cryptographic implementation of an exemplary embodiment of the present invention. This embodiment employs cryptographic techniques of an anonymous credential system based on Camenisch-Lysyanskaya signatures. A brief description of properties of Camenisch-Lysyanskaya signatures will be given first to assist understanding of the embodiment to be described.

Following is a discussion of Known Discrete-Logarithm-Based, Zero-Knowledge Proofs: In the common parameters model, we use several known results for proving statements about discrete logarithms such as: (1) proof of knowledge of a discrete logarithm modulo a prime or a composite; (2) proof of knowledge of equality of representation modulo two (possibly different) prime or composite moduli; (3)

proof that a commitment opens to the product of two other committed values; (4) proof that a committed value lies in a given integer interval; as well as (5) proof of the disjunction or conjunction of any two of the previous proofs. These protocols modulo a composite are secure under the assumption by Rivest, Shamir, Adleman (RSA) and modulo a prime under the discrete logarithm assumption.

When referring to the proofs above, the method depicted will follow the notation introduced by Camenisch and Stadler for various proofs of knowledge of discrete logarithms and proofs of the validity of statements about discrete logarithms. For instance, $$PK\{(\alpha, \beta, \delta): y = g\alpha h\beta \wedge \tilde{y} = \tilde{g}^\alpha \tilde{h}^\delta \wedge (u \leq \alpha \leq v)\}$$

denotes a "zero-knowledge Proof of Knowledge of integers $\alpha$, $\beta$, and $\delta$ such that $y = g\alpha h\beta$ and $\tilde{y} = \tilde{g}^\alpha \tilde{h}^\delta$ holds, where $u \leq \alpha \leq v$", and where $y, g, h, \tilde{y}, \tilde{g}, \tilde{h}$ are elements of some groups $G = \langle g \rangle = \langle h \rangle$ and $\tilde{G} = \langle \tilde{g} \rangle = \langle \tilde{h} \rangle$.

The convention is that Greek letters denote quantities of which knowledge is being proved, whereas all other values are known to the verifier. The method depicts an application of the known Fiat-Shamir heuristic to turn such proofs of knowledge into signatures on some message m; this is denoted as, e.g., $SPK\{(\alpha): y = g\alpha\}(m)$. Given a protocol in this notation, it is straightforward to derive an actual protocol implementing the proof, and suitable protocols for the following embodiment will be readily apparent to those skilled in the art.

In the embodiment, the method depicted includes a straightforward variant of the known methods of Camenisch-Lysyanskaya signatures that allows messages to be negative integers as well as positive. Let lm, le, ln, lr and L be system parameters. lr is a security parameter, and the meanings of the others will become apparent in the following.

The method depicted below in (a)-(d) denotes the set of integers $\{-(2^{l_m}-1), \ldots, (2^{l_m}-1)\}$ by $\pm\{0,1\}^{l_m}$. Elements of this set can thus be encoded as binary strings of length lm plus an additional bit carrying the sign, i.e., lm+1 bits in total. Key generation: on input ln, choose an ln-bit RSA modulus n such that $n = pq$, $p = 2p'+1$, $q = 2q'+1$, where $p, q, p',$ and $q'$ are primes. Choose, uniformly at random, $R0, \ldots, R_{L-1}, S, Z \in QR_n$. Output the public key $(n, R0, \ldots, R_{L-1}, S, Z)$ and the secret key $p$.

(a) Message space is the set $\{(m0, \ldots, m_{L-1}): m_i \in \pm\{0,1\}^{l_m}\}$.

(b) Signing algorithm: on input $m0, \ldots, m_{L-1}$, choose a random prime number $e$ of length $l_e > l_m + 2$, and a random number $v$ of length $l_v = l_n + l_m + l_r$.

(c) Compute $A = \left(\frac{Z}{R_0^{m_0} \cdots R_{L-1}^{m_{L-1}} S^v}\right)^{1/e} \mod n$ (d) The signature consists of $(e, A, v)$.

Verification algorithm: to verify that the tuple $(e, A, v)$ is a signature on message $(m0, \ldots, m_{L-1})$, check that the following statements hold:

$Z \equiv A^e R_0^{m_0} \cdots R_{L-1}^{m_{L-1}} S^v \pmod{n}$, $m_i \in \pm\{0,1\}^{l_m}$, and $2^{l_e} > e > 2^{l_e-1}$.

The following is proving knowledge of a signature in an embodiment of the present invention: the method depicted explains how a verifier such as verifier server 4 can prove possession of a CL signature without revealing any other information about the signature. The method depicted uses a discrete-logarithm-based zero-knowledge proof protocols as discussed above. If A were a public value, we could do so by proving knowledge representation of Z with respect to $R0, \ldots, RL-1$, S and A. However, making A public would make all transactions linkable. Luckily, one can randomize A: given a signature $(A, e, v)$, the tuple $(A' := AS^{-r} \mod n, e, v' := v + er)$ is a valid signature also for any value of r. Now, provided that $a \in \langle S \rangle$ and that r is chosen uniformly at random from $\{0,1\}^{l_n + l_\phi}$ the value A' is distributed statistically close to uniform over $Z^*_n$. Thus, the user could compute a fresh A' each time, reveal it, and then run the following protocol with the verifier:

$$PK\{(\epsilon, v', \mu_0, \ldots, \mu_{L-1}): Z \equiv \pm R_0^{\mu_0} \cdots R_{L-1}^{\mu_{L-1}} A'^\epsilon S^{v'} \\ \pmod{n} \wedge \mu_i \in \pm\{0,1\}^{l_m} \wedge \epsilon \in [2^{l_e-1}+1, 2^{l_e}-1]\}$$

Now, there is a technical consequence from this proof protocol regarding the statements $\mu_i \in \pm\{0,1\}^{l_m} \wedge \epsilon \in [2^{l_e-1}+1, 2^{l_e}-1]$. Although these can be implemented virtually for free, they require that the secret actually lies in a smaller interval, i.e. the signer needs to choose e from $\lfloor 2^{l_e-1} - 2^{l'_e}+1, 2^{l_e-1} + 2^{l'_e}-1 \rfloor$ with $l'_e < l_e - l_\phi - l_H - 3$ where $l_\phi$ and $l_H$ are security parameters (the first controlling statistical zero-knowledge and the second being the size of the challenge message in the PK protocol). Similarly, we require that the size of the message input to the signature scheme is limited: $m_i \in \pm\{0, 1\}^{l_m - l_\phi - l_H - 2}$. As the proofs can only guarantee that the absolute value of the messages are smaller than $2^{l_m}$, we also include negative messages in the message space for consistency. Finally, we note that in $Z \equiv \pm R_0^{\mu_0} \cdots R_{L-1}^{\mu_{L-1}} A'^\epsilon S^{v'} \pmod{n}$ there appears a "$\pm$". The above is a technicality in the proofs of knowledge in RSA groups: because of the group structure of $Z^*n$ and its sub-group $QR_n$ over a special RSA modulus n, there exist small-order subgroups which may allow a prover to include a multiple of small known order as well as to prove a statement for the negation with probability ½. This technicality is not a problem for the application at hand, however, because e (being an odd prime by definition) maintains the negation and allows a reduction to the strong RSA assumption in this case.

In the known Pedersen commitment scheme with the method depicted a group G of prime order q, and generators $(g0, \ldots, gm)$ as public parameters. To commit to the values $(v1, \ldots, vm) \in Z_q^m$, pick a random $r \in Z_q$ and set $C = Com(v1, \ldots, vm; r) = g_0^r \prod_{i=1}^m g_i^{v_i}$. As shown by Damgård and Fujisaki if the group G is an RSA group and the committer is not privy to the factorization of the modulus, then the Pedersen commitment scheme can be used to commit to integers of arbitrary size.

An embodiment of the authentication method based on the cryptographic principles set out above will be described with reference to FIG. 3.

Let $(n, R0, \ldots, RL-1, S, Z)$ be the public key of attribute provider 5 and $(\tilde{n}, \tilde{R}_0, \ldots, \tilde{R}_{L-1}, \tilde{S}, \tilde{Z})$ be the public key of the MNO. Let x be the user's secret key. This key x may be stored on the user computer 2, e.g. memory, persistent storage, or a secure hardware module such as a subscriber identification module (SIM) or SIM card. In another embodiment, the key x might be stored by an authentication server such as verifier server 4 accessible to user computer via a mobile network which may be network 1, or shared between the user computer and such an authentication server as can be achieved in known manner using a key-sharing protocol. The device identifier for user computer 2 is device identifier sid as before.

In a setup operation, the user obtains the attribute credential $C_{att}$ from attribute provider 5. The attribute credential is described for simplicity here as asserting a single attribute a to the user. The attribute credential is obtained in a known manner from attribute provider 5 by executing an issuance protocol. At the end of the issuance protocol, user computer 2 stores in memory or persistent storage a credential $C_{att}$ in the form of a signature (A, v, e), and messages x, sid and a, such that: $Z \equiv A^e R_0^x R_1^{sid} R_2^a S^v$ mod (n), x, sid, $a_\ell \in \pm \{0,1\}^{l_m}$, and $2^{l_e} > e > 2^{l_e - 1}$ holds. The attribute credential thus certifies the attribute a and device identifier sid under a private key of a first public-private key pair of attribute provider 5.

During issuance, the values x and device identifier sid can be hidden from attribute provider 5 as to further enhance security and privacy of the device user. The security enhancement can be achieved by exploiting the cryptographic functionality of the credential scheme in a known manner to one skilled in the art.

User computer 2 is brought or presented by the user to verifier server 4, situated at a location 1, providing access to a service provided by a service provider P. For simplicity in this example, the service provider P simply requires the user to prove possession of a credential that asserts an attribute a to the user. The particular transaction occurring between the device user and service provider P is defined by certain context information (e.g. identifier code for goods/services, cost, verifier server identifier, date, etc.).

When user computer 2 retrieves attribute credentials (step 301), the authentication process is initiated by as indicated at step 301 of FIG. 3 and user computer 2 is presented to verifier server 4. The attribute credentials retrieved may be stored, for example, in user computer 2 memory such as memory 406 or in persistent storage such as persistent storage 408. In step 310, verifier server 4 sends the policy data to user computer 2 together with a context message cxt defining the context information for the transaction. User computer 2 receives the policy data and context message in step 320.

In step 330, user computer 2 requests input by the user of the user password p. On receipt of the input password in step 34, user computer 2 performs a password verification process to verify that the input password is the correct user password p. The verification may involve checking the input password against a password p previously stored on user computer 2, e.g. in memory or persistent storage, or for example a SIM card. In another embodiment, the password verification process may require communication between user computer 2 and an authentication server such as verifier server 4 via a mobile network, for example, network 1. Such a verification process, for example, may be required to access the user's secret key x for the ensuing cryptographic procedure. If password verification fails in decision step 340 (e.g. after a threshold number of password attempts by the user), the authentication process is terminated (no branch, decision step 340).

When the input password is verified (yes branch, decision step 340), in step 350 the user computer communicates with via network 1 which may be a mobile network to request a location credential $C_{loc}$ from MNO server 6. In step 360, MNO server 6 determines the current location of user computer 2 as 1'. In step 370, MNO server 6 issues a location credential $C_{loc(1',t',sid)}$. The location credential generated by MNO server 6 certifies the device identifier sid, the location data 1', and a timestamp t' which indicates the issue time for the location credential $C_{loc}$. The location credential $C_{loc}$, which is received by user computer 2 in step 380, is in the form of a signature $(\tilde{A}, \tilde{e}, \tilde{v})$ on values sid, 1', and t', such that: $\tilde{Z} \equiv \tilde{A}^{\tilde{e}} \tilde{R}_0^{sid} \tilde{R}_1^{l'} \tilde{R}_2^{t'} \tilde{S}^{\tilde{v}}$ mod $(\tilde{n})$, sid, t', $l' \in \pm \{0,1\}^{l_m}$, and $2^{l_e} > \tilde{e} > 2^{l_e - 1}$ holds. The location credential $C_{loc}$ thus certifies the device identifier sid, location data 1' and timestamp t' under a private key of a second public-private key pair of the mobile network operator or MNO server 6.

In step 390, user computer 2 produces a blinded attribute credential and a blinded location credential by randomized blinding of the attribute credential and location credential respectively. In particular, user computer 2 picks random r and $\tilde{r}$ and computes $A' := AS^{-r}$ mod n, $v' := v + er$, $\tilde{A}' := \tilde{A} \tilde{S}^{-\tilde{r}}$ mod n, and $\tilde{v}' := \tilde{v} + \tilde{e}\tilde{r}$. Further, in step 401, user computer 2 computes proof Π and generates the authentication token T. Computing proof Π to determine or verify the credentials is performed as follows:

$$\Pi := SPK\{(\epsilon, \xi, \sigma, \nu, \tilde{\epsilon}\tilde{\nu}, \mu_0, \ldots, \mu_{L-1}):Z/$$
$$R_2^a \equiv A^\epsilon R_0^\xi R_1^\sigma S^{84} \pmod{n} \wedge$$

$$\tilde{Z}/\tilde{R}_1^{l'}\tilde{R}_2^{l'} \equiv \tilde{A}'^{\tilde{\epsilon}} \tilde{R}_0^\sigma \tilde{S}^{\tilde{\nu}} \pmod{\tilde{n}} \wedge \xi, \sigma \in \pm\{0,1\}^{l_m} \wedge$$

$$\epsilon, \tilde{\epsilon} \in [2^{l_e - 1} + 1, 2^{l_e} - 1]\}(A', \tilde{A}', t', a, l', P, cxt).$$

Proof Π is adapted for proving: (1) that the device identifier in the attribute credential equals the device identifier in the location credential; (2) possession by the user computer of the attribute and location credentials in the respective blinded credentials; (3) that the attribute credential contains the required attribute a; and (4) that the location credential certifies the location l' and timestamp t'. Proof Π is also dependent on the context message since proof Πis bound to cxt in the above example. The authentication token T is then generated as (A', Ã', a, t', l', Π). The authentication token T thus comprises the blinded attribute and location credentials $C_{loc}$, the attribute a to be demonstrated, the timestamp and current user location, and the proof Π.

In step 410, user computer 2 sends the authentication token T to verifier server 4. Verifier server 4 receives the authentication token T in step 420. In step 430, verifier server 4 performs a verification process (verify proof Π, check location and time). The verification process of authentication token T, as discussed earlier in step 401, is a cryptographic verification process which proves that the proof Πverifies or proves the facts itemized in relation to step 401 above and that proof Πis bound to the correct context message cxt. In this authentication procedure, verifier server 4 can use the public keys of the first and second key pairs described above to verify validity, respectively, of the attribute credential $C_{att}$ and location credential possessed by user computer 2. Verifier server 4 checks that the location l' of user computer 2 is close enough to the location l of verifier server 4 as determined by the threshold distance configured in authentication program 8. Verifier server 4 also checks that the issue time indicated by the timestamp t' is within a predetermined time interval preceding the current time t.

In decision step 440, verifier server 4 determines whether the verification is successful. If the verification is not successful (no branch, decision step 440), then verifier server 4 denies authentication of user computer 2 (step 460) and the authentication procedure ends. If the verification is successful (yes branch, decision step 440), then verifier server 4 authenticates user computer 2 (step 450) and the authentication procedure ends.

In addition to the advantages described earlier, use of the timestamp in this embodiment ensures that the authentication token T can only be used within a short time following issue of the location credential. Use of the context message further restricts use to the current transaction. The use of blinded credentials ensures that different transactions of the user cannot be linked by use of the credentials provided in authentication token T. The authentication token T is generated only if the input user password is verified. Therefore, the authentication procedure as depicted in FIG. 3 offers additional security and privacy for the user.

The above embodiment can be readily extended to attribute credentials asserting more than one attribute or multiple user attributes. Similarly, more complex access control policies are possible. Such policies, and how to fulfil them, are well known in the art and so details are omitted here for simplicity. In some embodiments, depending on the authentication condition defined in the policy data, attributes per se may not need to be revealed to the verifier such as verifier server 4: it may be sufficient to prove that the attribute set certified by the attribute credential $C_{att}$ contains one or more attributes which satisfy the required authentication condition.

Other embodiments may of course use anonymous credential schemes other than Camenisch-Lysyanskaya signature schemes, and in general, embodiments of the invention may be based on any convenient cryptographic credential system. Examples of other credential systems include self-blindable credentials and Microsoft Corporation's U-Prove system®.

In some embodiments, the procedure for obtaining the location credential may include communication with another server other than MNO server 6. For example, user computer 2 may communicate with an authentication server to obtain a credential certifying the device identifier and the location data obtained from the mobile network. Such a credential could be issued without disclosing the information certified to the authentication server. The location credential may only be issued if the user password is verified in this authentication procedure. The location of the verifier server 4 may be predetermined for the server or could be determined dynamically via a mobile network, e.g. for a verifier server comprising a hand-held payment terminal which may be used at multiple locations.

Alternative embodiments may not require communication of policy data. An authentication policy could be predefined at user computer 2, or a user computer could simply demonstrate all user attributes in an authentication process. In other embodiments, steps may be performed in a different order to that illustrated in FIGS. 2 and 3. Some steps may be performed simultaneously where appropriate.

It will be seen that the above embodiment allows the location of the user computer, securely authenticated by the mobile network, to be confirmed as in the vicinity of the verifier computer. The authentication procedure as discussed in FIGS. 2 and 3 prevents malicious use of the user's attribute credential $C_{att}$ by a device at another location, e.g. following capture and transmission by malware on the user computer. Even a long-term credential stored on user computer 2 is therefore protected against such malware. The location verification is achieved without revealing the device identifier sid to verifier server 4. The mobile network operator does not learn details of the user transaction with the verifier. Use of the policy data in the above process allows the user to reveal to the verifier only specific information about the certified attribute set which is necessary for authentication. The above embodiment thus maintains a high level of user privacy.

In embodiments where the set of user attributes att comprises payment account data, such as payment card details, issued to the user by an account issuer, the location of the user computer determined by the mobile network is not revealed to the account issuer. In a preferred embodiment here, the payment account data can be encrypted under a private key of a public-private key pair of the account issuer. In step 430 of the FIG. 3 process, the verifier server may further verify validity of the payment account data in dependence on the public key of the account-issuer public-private key pair. The payment can thus be authenticated by the verifier and payment obtained from the account issuer without the payment account data, including identity of the user, being revealed to the verifier, so further enhancing user privacy. In addition, the account issuer does not learn the location of the user computer as determined by the mobile network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical applications, or technical improvements over the technologies found in the marketplace, or to enable others of ordinary skill in the art to understand the embodiments disclosed herein.

Figure 4:
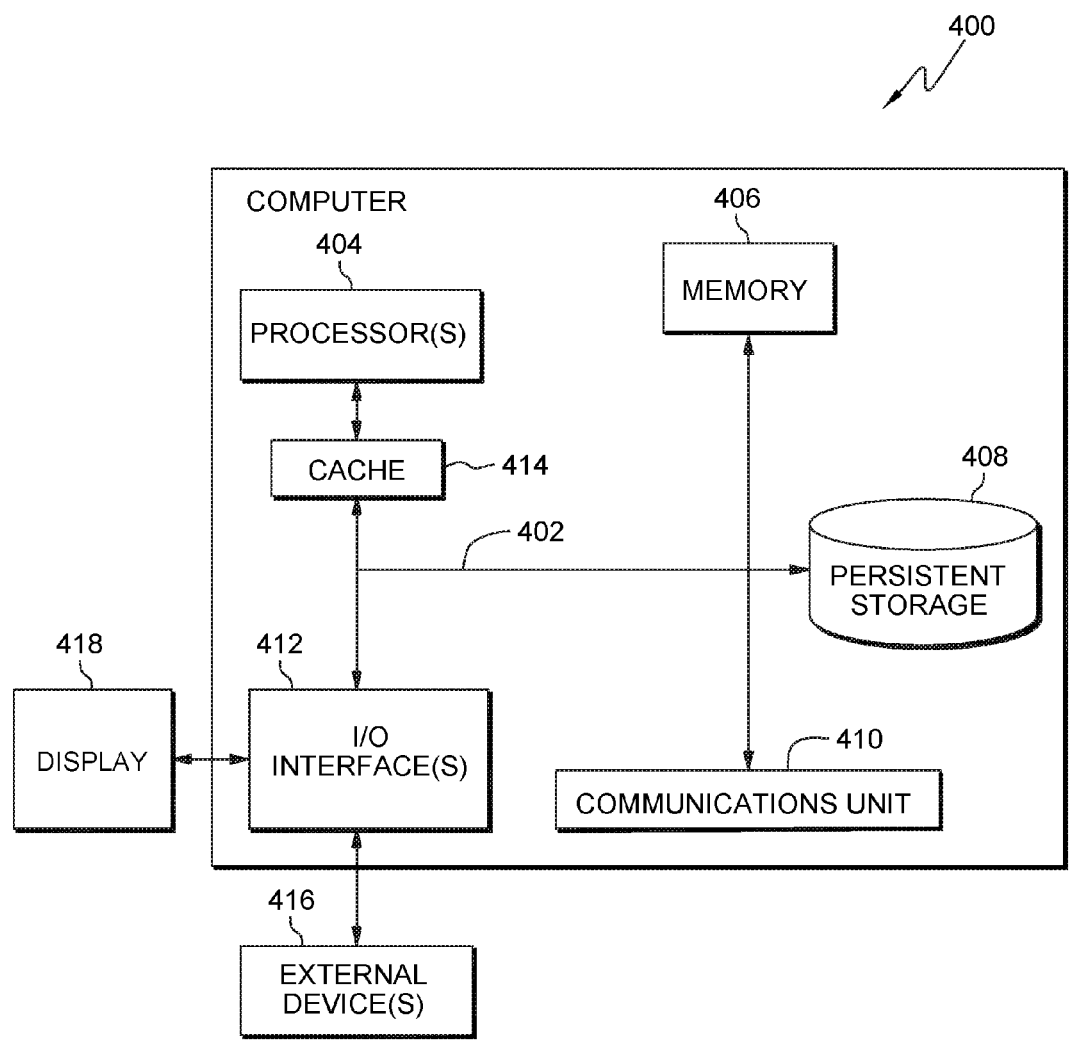
FIG. 4 depicts a block diagram of components of a computer system, which is an example of a system such as the server within the distributed data processing environment of FIG. 1, in accordance with an embodiment of the present invention.

FIG. 4 depicts a block diagram 400 of components of user computer 2, verifier server 4, attribute provider 5, and/or MNO server 6 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

User computer 2, verifier server 4, attribute provider 5, and/or MNO server 6 include processor(s) 404, cache 414, memory 406, persistent storage 408, communications unit 410, input/output (I/O) interface(s) 412, and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406. In some embodiments, memory 406 or persistent storage 408 may be a secure hardware module, such as a SIM or SIM card, where the device identifier sid is stored and bound to user computer 2.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in various embodiments, provides for communications with other data processing systems or devices, including resources of verifier server 4, attribute provider 5, and MNO server 6. In various embodiments, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to user computer 2. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., authentication program 8 and database 9, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A computer-implemented method for authenticating a user computer, connectable to a mobile network, the method comprising:
    retrieving, by one or more computing devices, an attribute credential, the attribute credential certifying a set of user attributes, a device identifier for identifying the user computer to the mobile network, a location credential, the location credential certifying a device identifier and location data indicating a current location of the user computer determined by the mobile network;
    producing, by one or more computing devices, an authentication token comprising the attribute credential, the location credential, the location data and a proof for proving that the device identifier in the attribute credential equals the device identifier in the location credential; and
    producing, by one or more computing devices, a blinded attribute credential by randomized blinding of the attribute credential, wherein the authentication token includes the blinded attribute credential and wherein the proof verifies possession by the user computer of the attribute credential in the blinded attribute credential.

2. The method as claimed in claim 1, wherein the location credential further comprises a timestamp indicating an issue time for the location credential, and wherein the timestamp is included in the authentication token.

3. The method as claimed in claim 1, further comprising sending, by one or more computing devices, the authentication token for authentication of the user computer.

4. The method as claimed in claim 1, further comprising, producing, by one or more computing devices, a blinded location credential by randomized blinding of the location credential, wherein the authentication token includes the blinded location credential and wherein the proof verifies possession by the user computer of the location credential in the blinded location credential.

5. The method as claimed in claim 1, further comprising, receiving, by one or more computing devices, policy data defining a condition for authentication of the user computer, wherein said proof verifies that the condition is satisfied by the set of user attributes in the attribute credential.

6. The method as claimed in claim 1 further comprising, receiving, by one or more computing devices, a context message defining context information for the authentication, wherein said proof is dependent on the context message.

7. The method as claimed in claim 1, wherein the location credential further comprises the location credential certifies the device identifier and the location data under a cryptographic key of a mobile network operator.

8. The method as claimed in claim 1, further comprising:
    requesting, by one or more computing devices, a user password;
    receiving, by one or more computing devices, a password input by a user; and
    performing, by one or more computing devices, a password verification process to verify the input password, wherein the password verification process is such that the authentication token is generated only if the input password is verified.

9. The method as claimed in claim 1, further comprises:
    certifying, by one or more computing devices, a timestamp indicating an issue time for the location credential and wherein the authentication token includes the timestamp;
    verifying, by one or more computing devices, that the location credential certifies the timestamp; and
    determining, by one or more computing devices, if the issue time indicated by the timestamp is within a predetermined time interval preceding a current time.

10. The method as claimed in claim 1, further comprising:
    certifying, by one or more computers, the device identifier and the set of user attributes under a private key of a first public-private key pair in the attribute credential;
    certifying, by one or more computers, the location data, a timestamp and the device identifier under a private key of a second public-private key pair in the location credential;
    verifying, by one or more computers, a validity of the attribute credential in dependence on the public key of said first public-private key pair; and
    verifying, by one or more computers, the validity of the location credential in dependence on the public key of said second public-private key pair.

11. The method as claimed in claim 6, wherein the authentication token is specific for the authentication identified by the context information.

12. A computer program product for authenticating a user computer, connectable to a mobile network, to a verifier server in the vicinity of the user computer, the computer program product comprising:
one or more computer readable storage devices and program instructions stored on the one or more computer readable storage device, the program instructions executable by a processor, the program instructions comprising:
program instructions to retrieve an attribute credential, the attribute credential certifying a set of user attributes, a device identifier for identifying the user computer to the mobile network, a location credential, the location credential certifying a device identifier and location data indicating a current location of the user computer determined by the mobile network;
program instructions to produce an authentication token comprising the attribute credential, the location credential, the location data and a proof for proving that the device identifier in the attribute credential equals the device identifier in the location credential; and
program instructions to produce a blinded attribute credential by randomized blinding of the attribute credential, wherein the authentication token includes the blinded attribute credential, and wherein the proof verifies possession by the user computer of the attribute credential in the blinded attribute credential.

13. The computer program product of claim 12, wherein the location credential further comprises the location credential certifies the device identifier and the location data under a cryptographic key of a mobile network operator.

14. The computer program product of claim 12, further comprising program instructions to produce a blinded location credential by randomized blinding of the location credential, wherein the authentication token includes the blinded location credential, and wherein the proof verifies possession by the user computer of the location credential in the blinded location credential.

15. The computer program product of claim 12, further comprising program instructions to receive policy data defining a condition for authentication of the user computer, wherein said proof verifies that the condition is satisfied by the set of user attributes in the attribute credential.

16. The computer program product of claim 12, further comprising:
program instructions to certify the device identifier and the set of user attributes under a private key of a first public-private key pair in the attribute credential;
program instructions to certify the location data, a timestamp and the device identifier under a private key of a second public-private key pair in the location credential;
program instructions to verify a validity of the attribute credential in dependence on the public key of said first public-private key pair; and
program instructions to verify the validity of the location credential in dependence on the public key of said second public-private key pair.

17. The computer program product of claim 12, further comprising:
program instructions to receive policy data defining a condition for authentication of the user computer, wherein said proof verifies that the condition is satisfied by the set of user attributes in the attribute credential; and
program instructions to verify from the proof that the condition is satisfied by said set of user attributes.

18. A computer system for authenticating a user computer, connectable to a mobile network, to a verifier server in the vicinity of the user computer, the computer system comprising:
one or more computer processors;
one or more computer readable storage media;
program instructions stored on the one or more computer readable storage media for execution by at least one of the one or more processors, the program instructions comprising:
program instructions to retrieve an attribute credential, the attribute credential certifying a set of user attributes, a device identifier for identifying the user computer to the mobile network, a location credential, the location credential certifying the device identifier and location data indicating the current location of the user computer determined by the mobile network;
program instructions to produce an authentication token comprising the attribute credential, the location credential, the location data and a proof for proving that the device identifier in the attribute credential equals the device identifier in the location credential; and
program instructions to produce a blinded attribute credential by randomized blinding of the attribute credential, wherein the authentication token includes the blinded attribute credential, and wherein the proof verifies possession by the user computer of the attribute credential in the blinded attribute credential.

19. The computer system of claim 18, wherein the location credential further comprises the location credential certifies the device identifier and the location data under a cryptographic key of a mobile network operator.

20. The computer system of claim 18, further comprising:
program instructions to certify the device identifier and the set of user attributes under a private key of a first public-private key pair in the attribute credential;
program instructions to certify the location data, a timestamp and the device identifier under a private key of a second public-private key pair in the location credential;
program instructions to verify a validity of the attribute credential in dependence on the public key of said first public-private key pair; and
program instructions to verify the validity of the location credential in dependence on the public key of said second public-private key pair.

* * * * *